United States Patent [19]

Stewart

[11] Patent Number: 4,490,118
[45] Date of Patent: Dec. 25, 1984

[54] AID AND METHOD FOR REMEDIAL READING INSTRUCTION

[76] Inventor: Geraldine L. Stewart, 14828 Green Valley Dr., Balch Springs, Tex. 75180

[21] Appl. No.: 530,504

[22] Filed: Sep. 9, 1983

[51] Int. Cl.$^3$ ............................................. G09B 17/00
[52] U.S. Cl. ........................................ 434/178; 434/172
[58] Field of Search ........................ 434/172, 178, 167

[56] References Cited

U.S. PATENT DOCUMENTS 1,142,947  6/1915  Ellis ..................................... 434/172
2,982,032  5/1961  Cooke ................................. 434/167

*Primary Examiner*—William H. Grieb
*Attorney, Agent, or Firm*—Glaser, Griggs & Schwartz

[57] ABSTRACT

A method for teaching word recognition in a course of reading instruction in which a student is taught to identify letters of the alphabet, to identify letters as being vowels or consonants and to recognize that combinations of letters and vowels form syllables. The method is based upon the student's recognition of the following voewl (V) and consonant (C) syllable patterns: V; CV; VC; CVC; CVV; and CVCE. A set of cards is provided with each card within the set bearing a syllable having a vowel or a combination of one or more consonants with one or more vowels arranged according to one or more of the syllable patterns. The student is instructed to select the card from the set which corresponds in sound with the first syllable of a selected word until the assembled cards define a selected word. The student is further instructed to apply a long sound or a short sound to each vowel or to treat a vowel as being silent according to its position relative to a consonant or to another vowel as follows: $\overline{V}$; $C\overline{V}$; $\breve{V}C$; $C\breve{V}C$; $C\overline{V}\not{V}$; and $C\overline{V}C\not{E}$, wherein $\overline{V}$ indicates a long sound value, $\breve{V}$ indicates a short sound value, and $\not{V}$, $\not{E}$ indicate silent value.

2 Claims, 2 Drawing Figures

AID AND METHOD FOR REMEDIAL READING INSTRUCTION

BACKGROUND OF THE INVENTION

1. Field of the Invention

This invention relates to a method for remedial reading instruction and to an aid for implementing the instruction method.

2. Description of the Prior Art

Contemporary reading instruction methods are focused on the attentive skills of the primary student. Teaching the adolescent or young adult who is classified as having a language learning disability requires considerably more skill and finesse. Although contemporary methods vary, most reading instruction techniques emphasize the following cognitive skills: (a) recognition of letters of the alphabet in cursive and manuscript in both upper and lower case; (b) word recognition; (c) word comprehension; and (d) reading comprehension.

The object of learning programs for language learning disabled students is reading comprehension. Reading comprehension cannot be mastered until the student has acquired word comprehension. Word comprehension, in turn, depends upon word recognition. Finally, word recognition depends upon recognition of the letters of the alphabet and syllabic combinations of letters. Thus, contemporary reading instruction programs involve a continuous chain of the foregoing cognitive skills which are initially learned one step at a time, with various combinations of the cognitive skill acquisition steps occurring simultaneously as the learning process accelerates with the student's age and maturity.

Typically, language learning disabled students are able to memorize and recognize letters of the alphabet, to identify vowels and consonants, and are able to memorize and recognize simple one syllable words. However, language is made up of thousands of words, and in the English language these words are formed most often of two, three and syllable combinations of letters. It is obvious then that language learning disabled students fail to acquire reading comprehension of text because text is composed of unfamiliar words having multiple syllable combinations of letters. Thus, the stumbling point for the language learing disabled student appears to occur between the stage of recognition of letters of the alphabet, and the stage of recognition of multiple syllable words.

Various techniques have been practiced for bridging the gap between the first stage of letter recognition and the second stage of word recognition. One such technique employs flash cards with the word inscribed on one side of the card and an illustration of the meaning of the word on the reverse side of the card. Another technique is the rote memory method of repetitive writing exercises. Additionally, certain programmed materials have been used in which the student is instructed to establish a correspondence between a multiple syllable word and the object or idea which it represents. This is an associative matching exercise in which a group of words are arranged in a column and a group of pictures are arranged in an opposite column, and the student is instructed to draw a line between the word and the picture which corresponds in meaning with the word.

Such word recognition methods have been used to good advantage by those students having average or better learning ability; however, the rate of growth of vocabulary and ability to comprehend is limited by the frequency of occurrence of previously memorized words in the reading text and by the student's ability to recall and recognize those same words without reference to pictoral representations of the words. A profound limitation is, of course, that the words of the English language are made up of many thousands of permutations and combinations of the twenty-six letters of the English alphabet. Thus, the reading development of the primary student who possesses only an average or below average learning ability and who relies substantially upon conventional rote memory or associative techniques is severely limited, and that student may eventually be classified as language learning disabled.

SUMMARY OF THE INVENTION

I have devised an improved method of word recognition involving syllable pattern recognition, which is enhanced by sound recognition of common diphthong and digraph combinations, and tactile differentiation and recognition of consonants.

The syllable pattern recognition feature of my method is based upon my determination that at least sixty percent of words in common use in the English language are composed of one or more syllables which may be classified according to the following vowel (V) and consonant (C) combinations: V; CV; VC; CVC; CVV; and, CVCE.

Moreover, I have determined that the vowel sound in each of the foregoing combinations is either long or short, depending upon its position relative to one or more consonants. For example, when standing alone, or when following a consonant in a two-letter syllable, the vowel sound is long, for example $\overline{V}$ and $C\overline{V}$. On the other hand, when the vowel precedes a consonant in a two-letter syllable or in a three-letter syllable, the vowel is short, for example, V̆C and CV̆C. In double vowel pattern CVV in which first and second vowels appear in sequence, the first vowel is long and the second vowel is silent, $C\overline{V}\!\!\!/\!V$. The same rule applies in the pattern CVCE in which the vowel is long and the E is silent: CVC$\cancel{E}$.

Recognition of the foregoing vowel/consonant patterns makes it possible for a student to visualize a new word as being more than a mere series of letters, and allows the student to resolve the word into its component syllables. After mentally separating the word its component syllables, the student can note to position of the vowel relative to the consonants and will be able to apply the correct long or short vowel sound to the syllable. The learning process occurs, in this instance, when the student resolves the unfamiliar, unknown word into subcombinations of letters which correspond with the familiar vowel/consonant patterns. When pattern recognition and syllable resolution have occurred, the student has moved from the known to the unknown and has bridged the gap between the stage of letter recognition to the stage of word recognition.

Correct pronunciation of the newly recognized word is aided by the student's ability to correctly assess the long or short characteristic of the vowel in each of the resolved syllables. Recognition of the new word is reinforced by the sound and tactile properties associated with commonly occurring diphthong, digraphs and irregular blends of consonants. The student is taught that each letter has a distinctive sound and feel when it is articulated. For example, vowels and diphthongs are articulated without oral contact. Articulation of consonants, digraphs and irregular blends of consonants involves a distinctive movement and touch of the tongue and lips in each case. Repetitive articulation of vowels, consonants and their special combinations reinforces the student's awareness and recognition of the correct sound value to be applied to vowels and consonants in an unfamiliar word.

ILLUSTRATIONS

Figure 1:
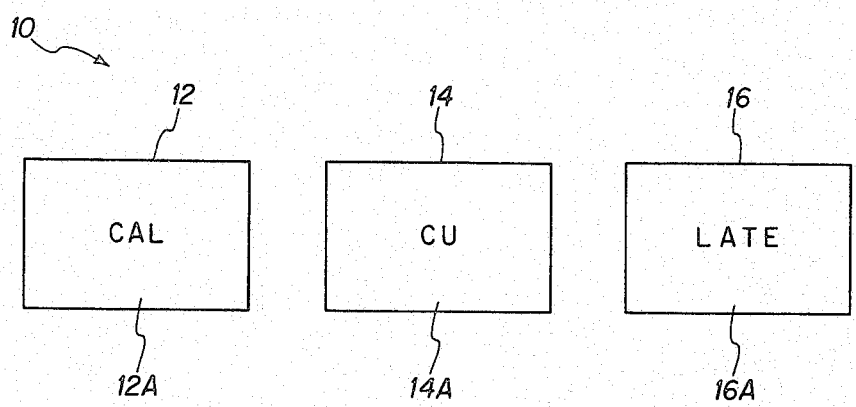
FIG. 1 shows the front sides of a set of card used in this invention.
Figure 2:
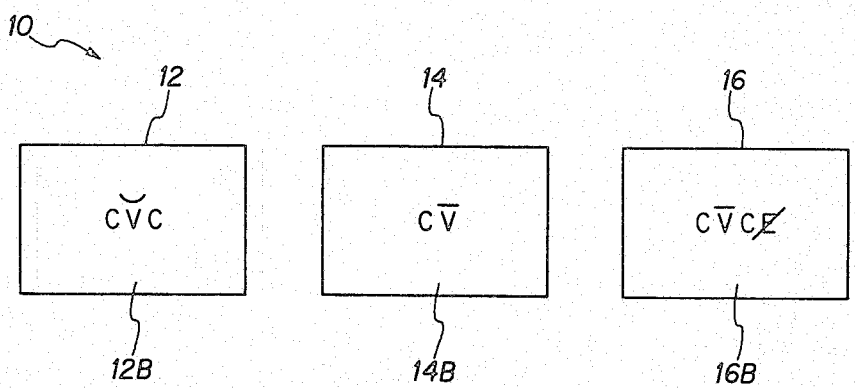
FIG. 2 shows the reverse side of the cards of FIG. 1.

My method can best be understood by reference to Table I, Table II and to FIGS. 1 and 2, which are appended hereto.

TABLE I

| Consonant-Vowel Patterns | Syllable Examples |
| --- | --- |
| V̄ | Ī, ā |
| CV̄ | wē, bī, gō |
| V̆C | ăt, ĕgg, ĭs, ŏf, ŭp |
| CV̆C | căt, mĕt, sĭt, gŏt, sŭn |
| CV̄y | paÿ, teä, tië, coät, huë, dyë |
| CV̄CE | latë, cedë, bikë, smokë, cubë |

TABLE II

| Word | No. of Vowels | No. of Syllables | Pattern |
| --- | --- | --- | --- |
| I | 1 | 1 | V̄ |
| BAT | 1 | 1 | CVC |
| SPEAK | 1 | 1 | CV̄yC |
| TRUM/PET | 2 | 2 | CVC/CV̆C |
| CAL/CU/LATE | 3 | 3 | CV̆C/CV̆/CV̄CE |
| AR/TIC/U/LATE | 4 | 4 | V̆C/CV̆C/V̄/CV̄E |

DESCRIPTION OF THE PREFERRED METHOD

Definitions:

Vowel: Letters that determine the direction of sound and the number of syllables a word will have. Sound is made without oral contact. A, E, I, O, U, and Y in a medial or final position and W when follows A or O.

Consonant: All letters that are not vowels including Y and W exempting the rules stated above. Oral contact necessary.

Diphthong: Two vowels used together to make a sound that neither could make alone: oi, oy, ou, ow, au, aw.

Digraph: Two consonants used together to make a sound that neither could make alone: sh, ch, wh, th, gh, ph.

Irregular Blend: Two consonants used at the beginning of a word when you only hear the second one: wr, kn, gn, pn, ps.

Spelling Aid: HEAR and FEEL Approach: All letters have a distinctive feel. Associations made (p-b, t-d, s-z, f-v, m-n).

Students are taught how to count syllables (vowel count and syllable count is always the same). Final e is never heard, therefore, is not counted. Two vowels together is bracketed and counted as one:

"a" is affected by l, w and r.

all vowels are affected by r.

"e" is affected by m and n.

"i" is affected by "gh".

When "y" is at the end of a one syllable word, it takes the sound of long "i". When "y" is the final letter of a two syllable word, it takes the sound of long "e"(by, candy).

Referring now to FIGS. 1 and 2 and TABLES I and II, a set 10 of cards 12, 14 and 16 have combinations of letters arranged in syllables on the front sides 12A, 14A, 16A of each card, with the consonant-vowel pattern imprinted on the reverse sides 12B, 14B and 16B of each card, respectively. These cards, when placed side-by-side as illustrated in FIG. 1, portray a three-syllable word, CALCULATE. Several such sets 10 of multiple syllable words are prepared and are enclosed in a packet for use by the student. After the student receives the packet, the cards are placed on his desk to display the syllable side of each card. The teacher then selects a word and pronounces the first syllable of that word and instructs the student to find the matching card. This process is repeated until the word has been pieced together. The meaning of the word is discussed and the student is instructed to pronounce the separate syllables of the word and to pronounce the word itself. For further reinforcement, the teacher may write sentences on the blackboard and let the student read the sentence aloud. The student may also be instructed to trace the word on a worksheet and to practice writing the word several times on a tablet.

The foregoing method is founded on the premise that sixty percent or more of the words which are commonly used in everyday language are composed of one or more syllables which include consonants and vowels arranged in one, two, three and four letter patterns as set forth in Table I. The truth of this premise can be demonstrated by selecting pages at random from a dictionary and analyzing each word of each page. Of course, there are exceptions, but substantially all of the words encountered by primary and intermediate readers can be resolved into syllabic components which correspond with the consonant-vowel patterns set forth in Table I. The reverse side of each card of the card set 10 may be used by the student to identify or confirm the consonant-vowel pattern for a particular syllable.

After practicing with several different word sets 10, the student is able to quickly recognize the component syllables of each word. Moreover, the student will know the correct pronunciation of the syllable since the long or short value of each vowel will also be known because of its position relative to the consonant.

My method presupposes that the student is capable of recognizing letters and is capable of distinguishing vowels and consonants, and that the student possesses a general awareness that syllables may be a single letter (a vowel) or may be a combination of vowels and consonants. It has been my experience that language learning disability students are at the Stage I level of letter recognition, vowel-consonant differentiation, and are generally familiar with the idea of combining vowels and consonants to form a syllable. With the additional knowledge of the consonant-vowel syllabic patterns as set out in Table I, the student is then able to analyze an unfamiliar word and resolve it into its component syllables, as illustrated in Table II. Although this analytical technique is not applicable to all words of the English language, it has been used successfully by my reading students, both primary and language learning disabled, to become proficient at word recognition and reading comprehension.

I claim:

1. A method for teaching word recognition in a course of reading instruction in which a student is taught to identify letters of the alphabet, to identify letters as being vowels or consonants, and to recognize that combinations of letters and vowels form syllables, comprising the steps of teaching the student to recognize the following vowel (V) and consonant (C) syllable patterns: V, CV, VC, CVC, CVV and CVCE; providing a set of cards, each card within the set bearing a syllable having a vowel or a combination of one or more consonants with one or more vowels arranged according to one of the patterns identified in the previous step; instructing the student to select the card from the set which corresponds in sound with the first syllable of a selected word; and, repeating the foregoing steps until the cards assembled by the student defined the selected word.

2. A method of teaching word recognition in a course of reading instruction as defined in claim 1, including the step of instructing the student to apply a long sound or a short sound to each vowel or to treat a vowel as being silent according to its position relative to a consonant or to another vowel as follows: V; $C\bar{V}$; $\breve{V}\cancel{C}$; $C\breve{V}C$; $C\bar{V}\cancel{V}$; $CVC\cancel{E}$; wherein V indicates a long sound value, $\breve{V}$ indicates a short sound value, and $\cancel{V}$, $\cancel{E}$ indicate silent value.

* * * * *